(12) United States Patent
Shih

(10) Patent No.: US 12,506,503 B2
(45) Date of Patent: Dec. 23, 2025

(54) TRANSCEIVER CIRCUIT

(71) Applicant: Realtek Semiconductor Corp., HsinChu (TW)

(72) Inventor: Yi-Chang Shih, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 347 days.

(21) Appl. No.: 18/120,959

(22) Filed: Mar. 13, 2023

(65) Prior Publication Data

US 2023/0299803 A1    Sep. 21, 2023

(30) Foreign Application Priority Data

Mar. 16, 2022    (TW) .................................. 111109638

(51) Int. Cl.
*H04B 1/38* (2015.01)
*H04B 1/00* (2006.01)

(52) U.S. Cl.
CPC ............... *H04B 1/38* (2013.01); *H04B 1/006* (2013.01); *H04B 1/0071* (2013.01)

(58) Field of Classification Search
CPC ........ H04B 1/00; H04B 1/006; H04B 1/0071; H04B 1/06; H04B 1/16; H04B 1/38; H04B 1/40
See application file for complete search history.

(56) References Cited

U.S. PATENT DOCUMENTS 6,892,060 B2 *  5/2005  Zheng ...................... H04B 1/28
                                                            455/302
8,145,168 B2 *  3/2012  Agawa ..................... H04B 1/38
                                                            455/334

(Continued)

FOREIGN PATENT DOCUMENTS

CN       103684494       3/2014
WO    2011/077618 A1    6/2011

OTHER PUBLICATIONS

Kim et al. "A Complex Band-Pass Filter for Low-IF Conversion DAB/T-DMB Tuner with I/Q Mismatch Calibration", IEEE Asian Solid-State Circuits Conference, Nov. 3-8, 2008 / Fukuoka, Japan, pp. 473-476. (Year: 2008).*

(Continued)

*Primary Examiner* — Quochien B Vuong
(74) *Attorney, Agent, or Firm* — Winston Hsu

(57) ABSTRACT

The present invention provides a transceiver circuit including receiver circuit, wherein the receiver circuit includes a first mixer, a second mixer, a complex filter, a switch module and an ADC. The first mixer is configured to mix an input signal with a first oscillation signal to generate a first mixed signal. The second mixer is configured to mix the input signal with a second oscillation signal to generate a second mixed signal. The complex filter is configured to generate a first intermediate frequency signal and a second intermediate frequency signal according to the first mixed signal and the second mixed signal. The switch module is configured to select one of the first intermediate frequency signal and the second intermediate frequency signal to serve as an output intermediate frequency signal. The ADC is configured to perform an analog-to-digital conversion operation on the output intermediate frequency signal to generate a digital signal.

9 Claims, 3 Drawing Sheets

(56) References Cited

U.S. PATENT DOCUMENTS

| | | | |
|---|---|---|---|
| 8,358,993 B2 * | 1/2013 | Quinlan | H03D 7/18 |
| | | | 455/285 |
| 8,831,549 B2 | 9/2014 | Lin | |
| 9,031,515 B2 * | 5/2015 | Mikhemar | H04B 1/006 |
| | | | 455/73 |
| 2009/0088101 A1 | 4/2009 | Agawa | |
| 2014/0080437 A1 | 3/2014 | Lin | |

OTHER PUBLICATIONS

Office action mailed/issued on Aug. 12, 2025 for CN application No. 202210306769.0, filing date: pp. 1-8, Aug. 12, 2025.

* cited by examiner

TRANSCEIVER CIRCUIT

BACKGROUND OF THE INVENTION

1. Field of the Invention

The present invention relates to a transceiver circuit.

2. Description of the Prior Art

Low-IF (intermediate frequency) receivers have been widely used in many electronic devices, and in order to achieve a better image rejection (IMR) ratio, the low-IF receiver generally include an in-phase channel, a quadrature channel and a complex filter, wherein and each channel has an analog-to-digital converter (ADC) for analog-to-digital conversion operations. However, the above-mentioned circuit architecture will make the low-IF receiver have larger chip area and power consumption.

SUMMARY OF THE INVENTION

It is therefore an objective of the present invention to provide a transceiver circuit, which has only one ADC to save chip area and power consumption, and the transceiver circuit can still maintain a better image rejection ratio, to solve the above-mentioned problems.

In one embodiment of the present invention, a transceiver circuit is disclosed. The transceiver comprises a receiver circuit, and the receiver circuit comprises a first mixer, a second mixer, a complex filter, a switch module and an analog-to-digital converter. The first mixer is configured to mix an input signal with a first oscillation signal to generate a first mixed signal. The second mixer is configured to mix the input signal with a second oscillation signal to generate a second mixed signal. The complex filter is configured to generate a first intermediate frequency signal and a second intermediate frequency signal according to the first mixed signal and the second mixed signal. The switch module is configured to receive the first intermediate frequency signal and the second intermediate frequency signal, and select one of the first intermediate frequency signal and the second intermediate frequency signal to serve as an output intermediate frequency signal. The analog-to-digital converter is configured to perform an analog-to-digital conversion operation on the output intermediate frequency signal to generate a digital signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
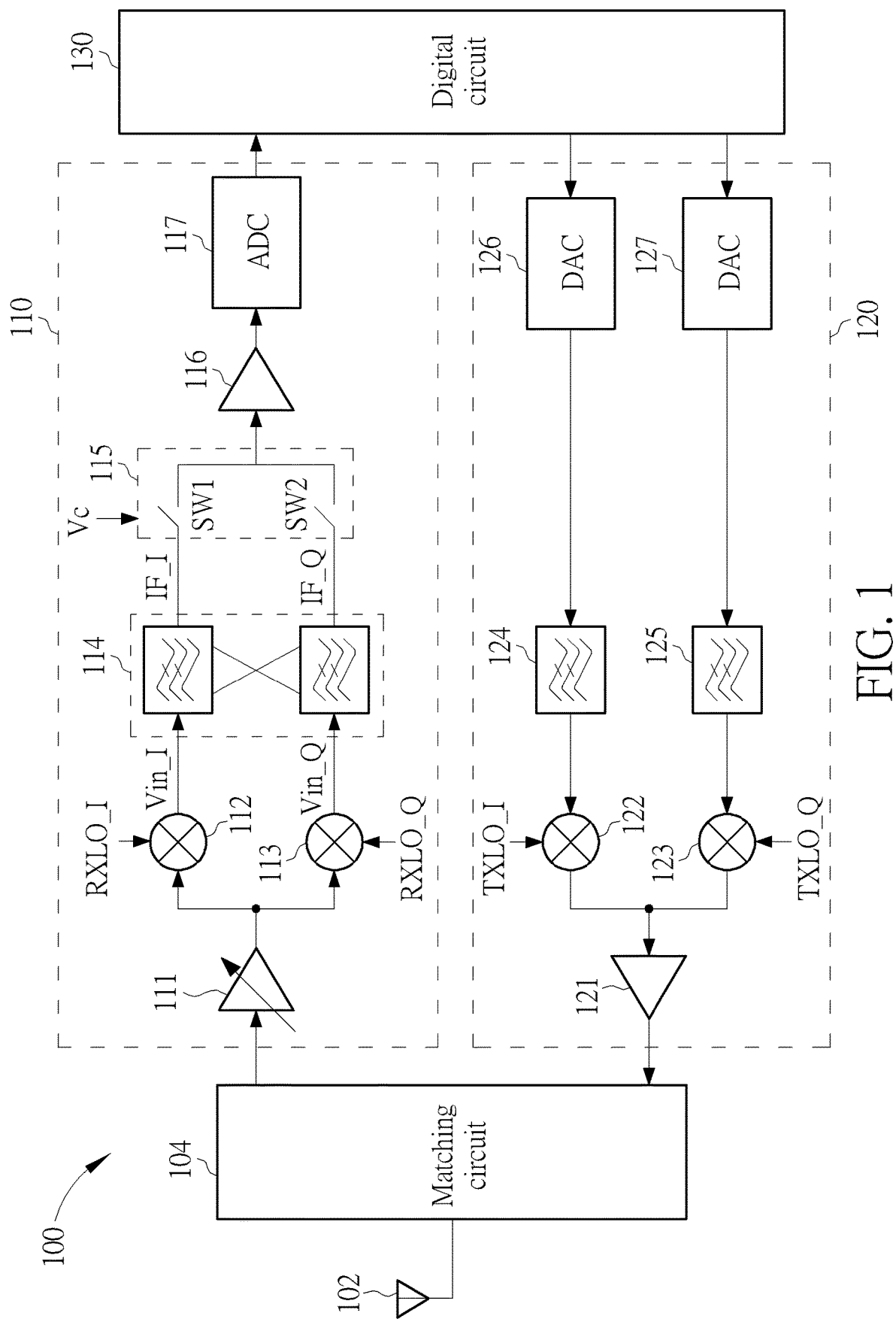
FIG. 1 is a diagram illustrating a transceiver according to one embodiment of the present invention.

FIG. 1 is a diagram illustrating a transceiver circuit 100 according to one embodiment of the present invention. As shown in FIG. 1, the transceiver circuit 100 comprises a receiver circuit 110, a transmitter circuit 120 and a digital circuit 130. The receiver circuit 110 comprises a low-noise amplifier 111, two mixers 112 and 113, a complex filter 114, a switch module 115, a programmable gain amplifier (PGA) 116, and an ADC 117, wherein the switch module 115 comprises two switches SW1 and SW2. The transmitter circuit 120 comprises a power amplifier 121, two mixers 122 and 123, two filters 124 and 125, and two digital-to-analog converters (DAC) 126 and 127. In this embodiment, the receiver circuit 110 and the transmitter circuit 120 are connected to an antenna 102 through a matching circuit 104 for signal reception and transmission. In addition, in this embodiment, the receiver circuit 110 is a low-IF receiver circuit.

In the operation of the receiver circuit 110, the low-noise amplifier 111 receives a received signal from the antenna 102 through the matching circuit 104, and processes the received signal to generate an input signal. Then, the mixer 112 mixes the input signal with an oscillation signal RXLO_I to generate a mixed signal Vin_I, and the mixer 114 mixes the input signal with an oscillation signal RXLO_Q to generate a mixed signal Vin_Q, wherein the oscillation signal RXLO_Q and the oscillation signal RXLO_I have the same frequency and have a phase difference of 90 degrees, that is, the mixed signal Vin_I corresponds to an in-phase channel, and the mixed signal Vin_Q corresponds to a quadrature channel. Then, the complex filter 114 receives the mixed signals Vin_I and Vin_Q to generate intermediate frequency signals IF_I and IF_Q, wherein the intermediate frequency signal IF_I corresponds to the in-phase channel, and the intermediate frequency signal IF_Q corresponds to the quadrature channel. In addition, since the operation of the complex filter 114 needs to use the signals of the in-phase channel and the quadrature channel at the same time, the complex filter 114 generates the intermediate frequency signal IF_I according to the mixed signals Vin_I and Vin_Q, and generates the intermediate frequency signal IF_Q according to the mixed signals Vin_I and Vin_Q. Since the complex filter 114 is well known to a person skilled in the art, its detailed circuit structure will not be described here. Then, the switch module 115 receives the intermediate frequency signals IF_I and IF_Q, and selects one of the intermediate frequency signals IF_I and IF_Q as an output intermediate frequency signal according to a control signal Vc. Specifically, when the control signal Vc indicates to output the intermediate frequency signal IF_I, the switch module 115 enables the switch SW1 and disables the switch SW2 to output the intermediate frequency signal IF_I; and when the control signal Vc indicates to output the intermediate frequency signal IF_Q, the switch module 115 enables the switch SW2 and disables the switch SW1 to output the intermediate frequency signal IF_Q. Then, the programmable gain amplifier 116 performs an amplifying operation on the output intermediate frequency signal to generate an amplified intermediate frequency signal, and the ADC 117 performs an analog-to-digital conversion operation on the amplified intermediate frequency signal to generate a digital signal to the digital circuit 130 for subsequent processing.

In the operation of the receiver circuit 110, because the switch module 115 selects only one of the intermediate frequency signals IF_I and IF_Q as the output intermediate frequency signal, only one programmable gain amplifier 116 and only one ADC 117 need to be set in the receiver circuit 110 to process the intermediate frequency signal IF_I or IF_Q, and it is not necessary to set two groups of circuits to process the intermediate frequency signals IF_I and IF_Q at the same time as in the prior art, so the receiver circuit 110 of this embodiment can reduce the chip area and power consumption.

However, because the circuits and signals in the in-phase channel and the quadrature channel of the receiver circuit 110 are not completely matched, for example, the phase difference between the oscillation signals RXLO_I and RXLO_Q is not exactly 90 degrees, and the gains of the in-phase channel and the quadrature channel are not exactly the same, so the responses of the complex filter 114 to the in-phase channel and the quadrature channel are inconsistent, and the intermediate frequency signals IF_I and IF_Q have different signal qualities. Therefore, in order to make the receiver circuit 110 to generate a better digital signal to the digital circuit 130, the present embodiment further proposes a method for automatically determining which of the intermediate frequency signals IF_I and IF_Q has better signal quality, and controls the switch module 115 to select an intermediate frequency signal with better signal quality from the intermediate frequency signals IF_I and IF_Q.

Specifically, when the transceiver circuit 100 is in a testing stage or just powered on, the transmitter circuit 120 transmits a plurality of test signals, and the receiver circuit 110 receives the plurality of test signals to determine the image rejection ratios of the intermediate frequency signals IF_I and IF_Q to determine which of the intermediate frequency signals IF_I and IF_Q has the better signal quality. In detail, referring to FIG. 1 and FIG. 2 together, first, the digital circuit 130 generates two digital test signals to the DACs 126 and 127 to generate two analog signals. The two analog signals are processed by the filters 124 and 125 to generate a first filtered signal and a second filtered signal, respectively. The mixer 124 mixes the first filtered signal with an oscillation signal TXLO_I to generate a first mixed signal, and the mixer 124 mixes the second filtered signal with an oscillation signal TXLO_Q to generate a second mixed signal, wherein the oscillation signal TXLO_Q and the oscillation signal TXLO_I have the same frequency and have a phase difference of 90 degrees. Then, the first mixed signal and the second mixed signal are combined and processed by the power amplifier 121 to generate a first test signal to the matching circuit 104. In this embodiment, the first test signal is used to represent a desired signal, and the frequency difference between the oscillation signal TXLO_I/TXLO_Q and the oscillation signal RXLO_I/RXLO_Q is the symbol "IF" shown in FIG. 2, where the symbol "TXLO" in FIG. 2 indicates the frequency of the oscillation signal TXLO_I/TXLO_Q, and the symbol "RXLO" indicates the frequency of the oscillation signal RXLO_I/RXLO_Q. In addition, the frequency of the desired signal is within the pass-band of the complex filter 114.

Figure 2:
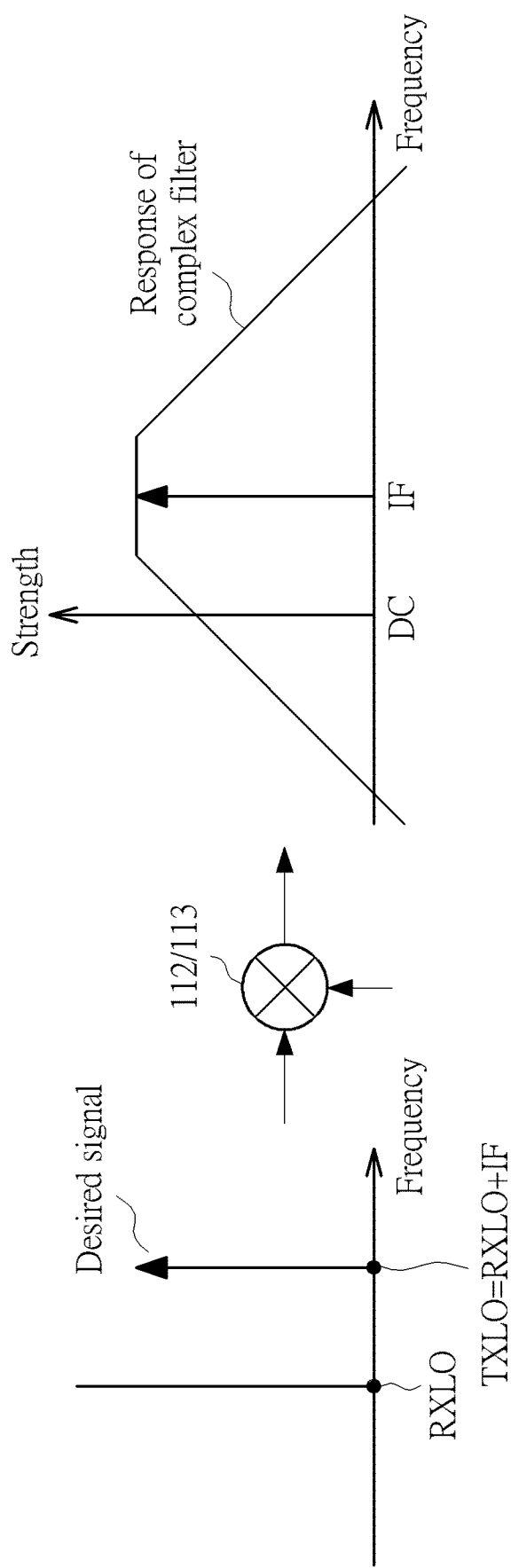
FIG. 2 is a diagram of a desired signal after being processed by a mixer and a complex filter.

The receiver circuit 110 receives the first test signal generated by the transmitter circuit 120 through the matching circuit 104, and processes the first test signal as a received signal. At this time, the digital circuit 130 can generate the control signal Vc to control the switch module 115 to select the intermediate frequency signal IF_I. As shown in FIG. 2, after being processed by the mixers 112/113 and the complex filter 114, the intermediate frequency signals IF_I and IF_Q comprise signal components corresponding to the frequency "IF", wherein the intermediate frequency signals IF_I, IF_Q are close to a DC level. It should be noted that the response of the complex filter 114 shown in FIG. 2 is an ideal case, and in practice, the response of the complex filter 114 is not perfectly symmetrical because of the mismatch between the in-phase channel and the quadrature channel. Then, since the switch module 115 has been controlled to output the intermediate frequency signal IF_I, the programmable gain amplifier 116 and the ADC 117 process the intermediate frequency signal IF_I to generate a digital signal to the digital circuit 130, for the digital circuit 130 to determine the intensity of the intermediate frequency signal IF_I comprising the desired signal.

Figure 3:
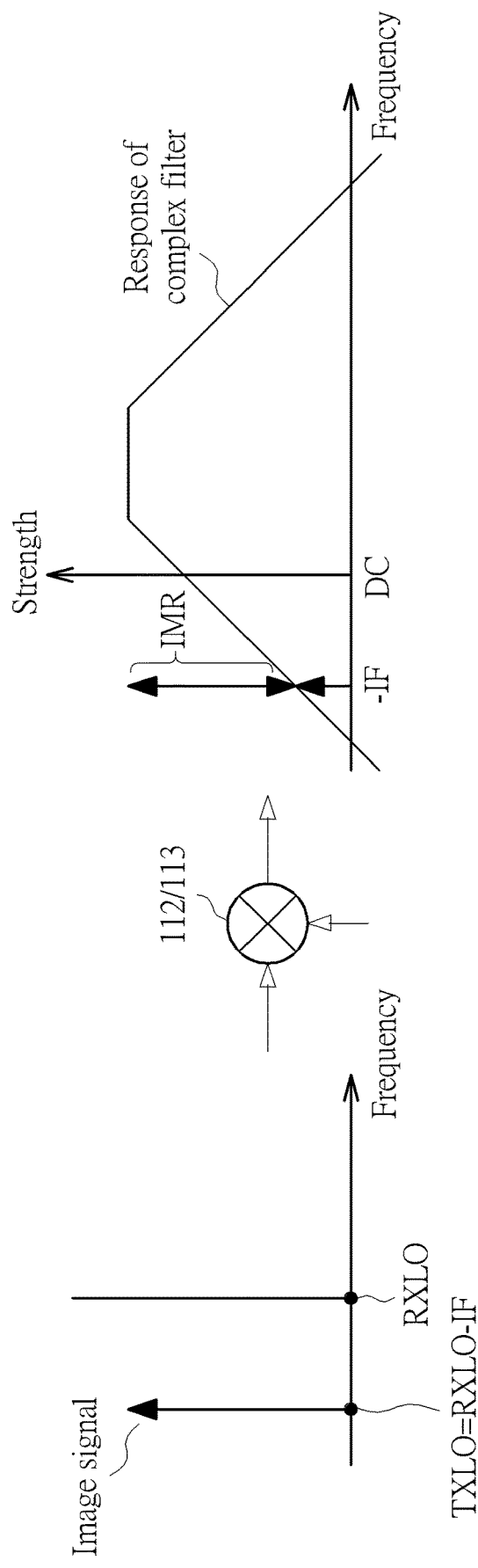
FIG. 3 is a diagram of an image signal after being processed by a mixer and a complex filter.

Then, the digital circuit 130 generates two digital test signals to the transmitter circuit 120 again, and the transmitter circuit 120 performs a similar operation to generate a second test signal to the matching circuit 104. Referring to FIG. 3, in this embodiment, the second test signal is used to represent an image signal corresponding to the desired signal in FIG. 2, and the frequency difference between the oscillation signal TXLO_I/TXLO_Q and the oscillation signal RXLO_I/RXLO_Q is the symbol "IF" as shown in FIG. 3, that is, if the frequency TXLO of the first test signal shown in FIG. 2 is "RXLO+IF", the frequency TXLO of the second test signal shown in FIG. 3 is "RXLO−IF".

The receiver circuit 110 receives the second test signal generated by the transmitter circuit 120 through the matching circuit 104, and processes the second test signal as a received signal. At this time, the digital circuit 130 has generated the control signal Vc to control the switch module 115 to select the intermediate frequency signal IF_I. As shown in FIG. 3, after being processed by the mixers 112/113 and the complex filter 114, the intermediate frequency signals IF_I and IF_Q comprise signal components corresponding to the frequency "−IF". Then, since the switch module 115 has been controlled to output the intermediate frequency signal IF_I, the programmable gain amplifier 116 and the ADC 117 process the intermediate frequency signal IF_I to generate a digital signal to the digital circuit 130, for the digital circuit 130 to determine the intensity of the intermediate frequency signal IF_I comprising the image signal.

As described above, since the digital circuit 130 determines the strength of the required signal and the strength of the image signal, the image rejection ratio of the intermediate frequency signal IF_I can be calculated, wherein the calculation of the image rejection ratio can refer to FIG. 3, that is, the degree of attenuation of the image signal after passing through the complex filter 114.

It should be noted that, in the embodiments of FIG. 2 and FIG. 3, the frequency of the desired signal is "RXLO+IF", and the frequency of the image signal is "RXLO−IF", but it's not a limitation of the present invention. In other embodiments, the frequency of the desired signal may be "RXLO−IF", the frequency of the image signal may be "RXLO+IF", and the center frequency of the complex filter 114 may be located near "RXLO−IF". This alternative design shall fall within the scope of the present invention.

Then, similarly, the digital circuit 130 generates two digital test signals to the transmitter circuit 120 again, and the transmitter circuit 120 performs a similar operation to generate a third test signal to the matching circuit 104. Referring to FIG. 2, in this embodiment, the third test signal is used to represent a desired signal shown in FIG. 2, and the frequency difference between the oscillation signal TXLO_I/TXLO_Q and the oscillation signal RXLO_I/RXLO_Q is the symbol "IF" shown in FIG. 2.

The receiver circuit 110 receives the third test signal generated by the transmitter circuit 120 through the matching circuit 104, and processes the third test signal as a received signal. At this time, the digital circuit 130 can generate the control signal Vc to control the switch module 115 to select the intermediate frequency signal IF_Q. As shown in FIG. 2, after being processed by the mixers 112/113 and the complex filter 114, the intermediate frequency signals IF_I and IF_Q comprise signal components corresponding to the frequency "IF". Since the switch module 115 has been controlled to output the intermediate frequency signal IF_Q, the programmable gain amplifier 116 and the ADC 117 process the intermediate frequency signal IF_Q to generate a digital signal to the digital circuit 130, for the digital circuit 130 to determine the intensity of the intermediate frequency signal IF_Q comprising the desired signal.

Then, the digital circuit 130 generates two digital test signals to the transmitter circuit 120 again, and the transmitter circuit 120 performs a similar operation to generate a fourth test signal to the matching circuit 104.

Referring to FIG. 3, in this embodiment, the fourth test signal is used to represent an image signal corresponding to the desired signal in FIG. 2, and the frequency difference between the oscillation signal TXLO_I/TXLO_Q and the oscillation signal RXLO_I/RXLO_Q is the symbol "IF" as shown in FIG. 3, that is, if the frequency TXLO of the third test signal shown in FIG. 2 is "RXLO+IF", the frequency TXLO of the fourth test signal shown in FIG. 3 is "RXLO−IF".

The receiver circuit 110 receives the fourth test signal generated by the transmitter circuit 120 through the matching circuit 104, and processes the fourth test signal as a received signal. At this time, the digital circuit 130 has generated the control signal Vc to control the switch module 115 to select the intermediate frequency signal IF_Q. As shown in FIG. 3, after being processed by the mixers 112/113 and the complex filter 114, the intermediate frequency signals IF_I and IF_Q comprise signal components corresponding to the frequency "−IF". Then, since the switch module 115 has been controlled to output the intermediate frequency signal IF_Q, the programmable gain amplifier 116 and the ADC 117 process the intermediate frequency signal IF_Q to generate a digital signal to the digital circuit 130, for the digital circuit 130 to determine the intensity of the intermediate frequency signal IF_Q comprising the image signal.

As described above, since the digital circuit 130 determines the strength of the required signal and the strength of the image signal, the image rejection ratio of the intermediate frequency signal IF_Q can be calculated.

After determining the image rejection ratio of the intermediate frequency signal IF_I and the image rejection ratio of the intermediate frequency signal IF_Q, the digital circuit 130 can determine which one of the intermediate frequency signals IF_I and IF_Q has better signal quality, and in the subsequent operations of the transceiver circuit 100, the digital circuit 130 can generate the control signal Vc to control the switch module 115 to select an intermediate frequency signal with better signal quality as the output intermediate frequency signal for processing by the programmable gain amplifier 116 and the ADC 117.

It should be noted that the generation and processing order of the above-mentioned first test signal, second test signal, third test signal and fourth test signal is not a limitation of the present invention, that is, the order in which the digital circuit 130 determines the strength of the intermediate frequency signal IF_I comprising the desired signal, the strength of the intermediate frequency signal IF_I comprising the image signal, the strength of the intermediate frequency signal IF_Q comprising the desired signal and the strength of the intermediate frequency signal IF_Q comprising the image signal can be changed without affecting the spirit of the present invention.

It should be noted that the above calculation of the image rejection ratios of the intermediate frequency signals IF_Q and IF_Q is only an example, rather than a limitation of the present invention. In other embodiments of the present invention, the image rejection ratio can be replaced by any quality parameter that can reflect the attenuation degree of the image signals of the intermediate frequency signals IF_Q and IF_Q, and the digital circuit 130 can determine which one of the intermediate frequency signals IF_I and IF_Q should be selected for subsequent processing according to the quality parameters of the intermediate frequency signals IF_Q and IF_Q. These alternative designs shall fall within the scope of the present invention.

In addition, in the embodiment shown in FIG. 1, the receiver circuit 110 receives the first test signal, the second test signal, the third test signal and the fourth test signal generated by the transmitter circuit 120, however, this feature is not a limitation of the present invention. In another embodiment, the first test signal, the second test signal, the third test signal and the fourth test signal can be generated by an external test device, and the receiver circuit 110 receives these test signals through the antenna 102. This alternative design shall fall within the scope of the present invention.

Briefly summarized, in the transceiver circuit of the present invention, only one of the two intermediate frequency signals generated by the receiver circuit will be used as an output intermediate frequency signal for subsequent operations. Therefore, the receiver circuit only needs to set one programmable gain amplifier and one ADC to process the intermediate frequency signal, and it is not necessary to set two groups of circuits to process two intermediate frequency signals at the same time as in the prior art, so the present invention can reduce the chip area and power consumption. In addition, by calculating the quality parameters of the two intermediate frequency signals to select the intermediate frequency signal with better quality for subsequent operations, the signal quality can be maintained while reducing the chip area and power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transceiver circuit, comprising:
   a receiver circuit, wherein the receiver circuit comprises:
   a first mixer, configured to mix an input signal with a first oscillation signal to generate a first mixed signal;
   a second mixer, configured to mix the input signal with a second oscillation signal to generate a second mixed signal;
   a complex filter, configured to generate a first intermediate frequency signal and a second intermediate frequency signal according to the first mixed signal and the second mixed signal;
   a switch module, configured to receive the first intermediate frequency signal and the second intermediate frequency signal, and select one of the first intermediate frequency signal and the second intermediate frequency signal to serve as an output intermediate frequency signal; and an analog-to-digital converter, configured to perform an analog-to-digital conversion operation on the output intermediate frequency signal to generate a digital signal;

wherein a control signal is generated according to signal qualities of the first intermediate frequency signal and the second intermediate frequency signal, and the switch module selects an intermediate frequency signal with better signal quality from the first intermediate frequency signal and the second intermediate frequency signal according to the control signal to generate the output intermediate frequency signal.

2. The transceiver circuit of claim 1, wherein the control signal is generated according to an image rejection ratio of the first intermediate frequency signal and an image rejection ratio of the second intermediate frequency signal, and the switch module selects the intermediate frequency signal with better image rejection ratio from the first intermediate frequency signal and the second intermediate frequency signal according to the control signal to generate the output intermediate frequency signal.

3. The transceiver circuit of claim 1, wherein the receiver circuit only sets the analog-to-digital converter to receive the output intermediate frequency signal, and does not comprise any other analog-to-digital converter for receiving the first intermediate frequency signal or the second intermediate frequency signal.

4. The transceiver circuit of claim 1, wherein the receiver circuit further comprises:
a programmable gain amplifier, coupled between the switch module and the analog-to-digital converter, configured to amplify the output intermediate frequency signal to generate an amplified intermediate frequency signal;
wherein the analog-to-digital converter performs the analog-to-digital conversion operation on the amplified intermediate frequency signal to generate the digital signal; and the receiver circuit only sets the programmable gain amplifier and the analog-to-digital converter to receive the output intermediate frequency signal, and does not comprise any other programmable gain amplifier and any other analog-to-digital converter for receiving the first intermediate frequency signal or the second intermediate frequency signal.

5. A transceiver circuit, comprising:
a receiver circuit, wherein the receiver circuit comprises:
a first mixer, configured to mix an input signal with a first oscillation signal to generate a first mixed signal;
a second mixer, configured to mix the input signal with a second oscillation signal to generate a second mixed signal;
a complex filter, configured to generate a first intermediate frequency signal and a second intermediate frequency signal according to the first mixed signal and the second mixed signal;
a switch module, configured to receive the first intermediate frequency signal and the second intermediate frequency signal, and select one of the first intermediate frequency signal and the second intermediate frequency signal to serve as an output intermediate frequency signal according to a control signal; and an analog-to-digital converter, configured to perform an analog-to-digital conversion operation on the output intermediate frequency signal to generate a digital signal;
a transmitter circuit, configured to transmit a plurality of test signals; and
a digital circuit;
wherein the receiver circuit receives the plurality of test signals to generate a plurality of digital signals to the digital circuit, and the digital circuit determines a quality parameter of the first intermediate frequency signal and a quality parameter of the second intermediate frequency signal, and compares the quality parameter of the first intermediate frequency signal and the quality parameter of the second intermediate frequency signal to generate the control signal.

6. The transceiver circuit of claim 5, wherein the digital circuit determines an image rejection ratio of the first intermediate frequency signal and an image rejection ratio of the second intermediate frequency signal, and generates the control signal to control the switch module to select an intermediate frequency signal with better image rejection ratio from the first intermediate frequency signal and the second intermediate frequency signal to generate the output intermediate frequency signal.

7. The transceiver circuit of claim 5, wherein the plurality of test signals comprise a first test signal, a second test signal, a third test signal and a fourth test signal; the receiver circuit receives the first test signal as the input signal, and the control module selects the first intermediate frequency signal to serve as the output intermediate frequency signal, and the analog-to-digital converter performs the analog-to-digital conversion operation on the output intermediate frequency signal to generate a first digital signal; the receiver circuit receives the second test signal as the input signal, and the control module selects the first intermediate frequency signal to serve as the output intermediate frequency signal, and the analog-to-digital converter performs the analog-to-digital conversion operation on the output intermediate frequency signal to generate a second digital signal; the receiver circuit receives the third test signal as the input signal, and the control module selects the second intermediate frequency signal to serve as the output intermediate frequency signal, and the analog-to-digital converter performs the analog-to-digital conversion operation on the output intermediate frequency signal to generate a third digital signal; the receiver circuit receives the fourth test signal as the input signal, and the control module selects the second intermediate frequency signal to serve as the output intermediate frequency signal, and the analog-to-digital converter performs the analog-to-digital conversion operation on the output intermediate frequency signal to generate a fourth digital signal; and the digital circuit determines the quality parameter of the first intermediate frequency signal and the quality parameter of the second intermediate frequency signal according to the first digital signal, the second digital signal, the third digital signal and the fourth digital signal.

8. The transceiver circuit of claim 7, wherein the digital circuit determines the quality parameter of the first intermediate frequency signal according to the first digital signal and the second digital signal, and determines the quality parameter of the second intermediate frequency signal according to the third digital signal and the fourth digital signal.

9. The transceiver circuit of claim 8, wherein a frequency of the first test signal is "RXLO+IF", a frequency of the first second signal is "RXLO-IF", a frequency of the third test signal is "RXLO+IF", and a frequency of the fourth test signal is "RXLO-IF", wherein "RXLO" is a frequency of the first oscillation signal and the second oscillation signal, and "IF" is a frequency value.

\* \* \* \* \*